Sept. 10, 1968   S. DIXON ET AL   3,400,989
BEARING SEALS
Filed Feb. 2, 1966   2 Sheets-Sheet 1

Sept. 10, 1968     S. DIXON ET AL     3,400,989

BEARING SEALS

Filed Feb. 2, 1966                                  2 Sheets-Sheet 2

United States Patent Office 3,400,989
Patented Sept. 10, 1968

3,400,989
BEARING SEALS
Sidney Dixon and Reginald H. Chinnery, Newcastle-upon-Tyne, England, assignors to George Angus & Company Limited, Newcastle-upon-Tyne, England
Filed Feb. 2, 1966, Ser. No. 524,604
Claims priority, application Great Britain, Feb. 23, 1965, 7,740/65
2 Claims. (Cl. 308—187.2)

ABSTRACT OF THE DISCLOSURE

A seal for rolling bearings has a radial web joining a flexible lip at one periphery and a bead at its other periphery, which web is reinforced by a flat rigid ring extending radially into the bead, the bead having a plane radial surface substantially in the medial plane of the rigid ring, a frusto-conical lead-in surface meeting the radial surface in a feather edge and an annular surface extending to the plane surface and forming with it a rabbett, the frusto-conical surface and the rabbett facing in opposite directions.

---

Figure 1:
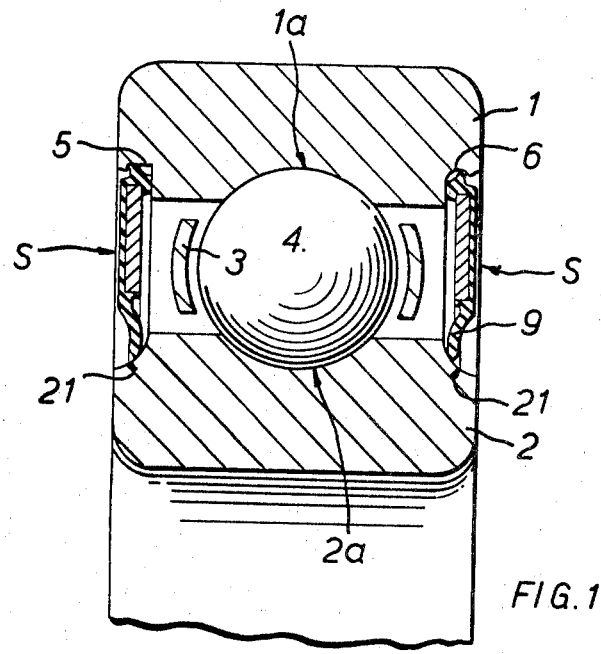

This invention relates to seals for rolling bearings of the class, hereinafter referred to as the class specified, comprising an inner race, an outer race encircling the inner race in radially-spaced relation thereto, rolling elements between, and running on tracks on, the races and one or more resilient ring seals, the or each ring seal extending across the annular space between the races and having a flexible peripheral lip in rubbing contact with one of the races and a peripheral bead in an annular radially-facing groove in the other of the races.

Usually there are two such seals, one at each side of the row of rolling elements, such as balls or rollers. Also the grooves are usually in the outer race; however, in some circumstances, the grooves may be in the inner race. Further the ring seal is stiffened by a rigid ring.

In use, the bead acts to retain the ring seal in position and to seal against the grooved race, and the flexible lip seals against the relatively rotating race. The seal is intended to retain lubricant in the bearing and exclude dirt from the bearing.

Large numbers of such ring seals are used, particularly in motor vehicles, and the requirements are that they should be easily and quickly fitted to the bearing yet hold securely in place and provide effective sealing for long periods of use.

The invention has for an object to provide a simple ring seal to meet the above requirements.

According to the invention, a resilient ring seal for a bearing of the class specified has the bead, which is intended to engage the groove in the race, formed with a bevel facing axially in one direction and a rabbett facing in the opposite direction so as to present a sloping surface leading to an abrupt step.

The sloping surface provides a lead-in which facilitates fitting the ring seal, by simple axial pressure, in a groove of a depth to receive the bead which deflects to enter the groove and then recovers for the abrupt step to serve as an abutment buttressed to resist axial deflection in the opposite direction and thus to retain the bead as a snap-in fit in the groove.

The ring seal has a rigid ring embedded coaxially therein and the abrupt step is in a plane within the thickness of the rigid ring, preferably in the medial plane thereof, so that the rigid ring opposes radial deflection of the bead in the plane of the step. Thus, although the rabbett permits axial deflection or bending of the bead due to axial pressure on the bevel slope when the seal is pressed into a groove, radial deflection of the bead is opposed by the rigid ring and axial deflection in the other direction is opposed by the buttress effect of the bevel so that the seal will hold firmly in a suitable groove.

Moreover, the junction of the bevel and the step forms a feather edge which will spread sufficiently against the inside of a groove, of rectangular or circular cross-section, to form a static seal therein. The seal-holding groove in a bearing race is usually an undercut groove so that the race has an annular inner radial shoulder against which a ring seal of appropriate thickness can bear by a radial surface extending from the bevel, and the feather edge of the seal engages in its groove with a resilient reaction pressure having a radial and an axial component.

The seals of the present invention will usually be moulded of an oil-resistant synthetic rubber or equivalent elastomer, such as a butadiene acrylic nitrile copolymer, and the rigid rings will be plain metal washers bonded in place as mould inserts.

The invention also includes bearings of the class specified as having one or more seals as above set forth.

Figure 2:
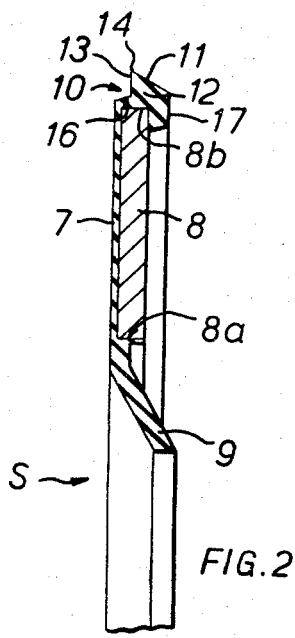
Figure 3:
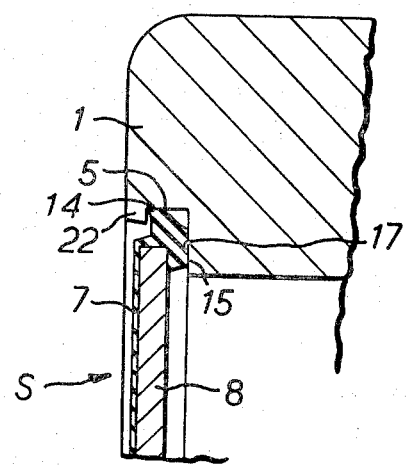
Figure 4:
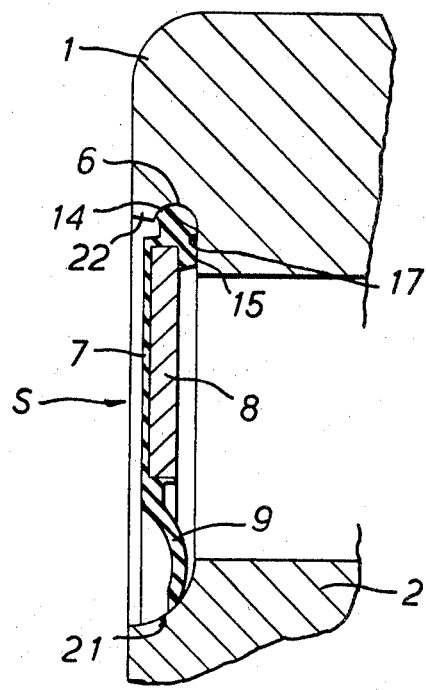
Figure 5:
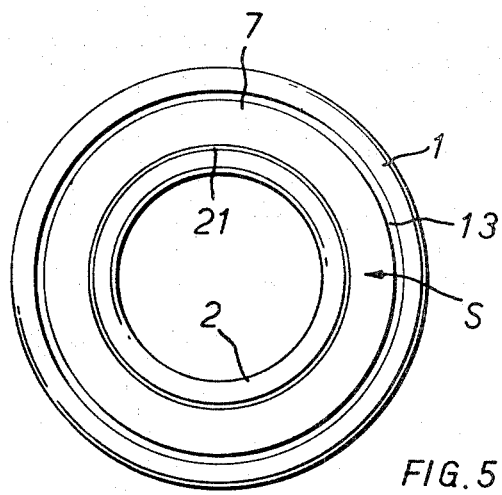

The invention is illustrated by way of example in the accompanying drawings, in which:

FIG. 1 is a radial section, in an axial plane, of a rolling bearing fitted with two resilient ring bearing seals, FIG. 2 is a radial section through the sealing ring, drawn to a larger scale than FIG. 1, and shows the ring when unstressed, FIG. 3 is a radial section to the same scale as FIG. 2 showing the sealing ring fitted in one form of groove in an outer race of a rolling bearing, FIG. 4 is a view corresponding to FIG. 3 showing the sealing ring in another form of groove in an outer race of a rolling bearing, and FIG. 5 is an axial view to a smaller scale than any of FIGS. 1 to 4 of a sealed bearing.

The rolling bearing comprises (FIGS. 1 and 5) an outer annular race 1, an inner annular race coaxially within and radially-spaced from the outer race 1, a row of rolling elements 4, shown as balls, running on tracks 1a and 2a formed on the races, a cage 3 housing the rolling elements, and a pair of resilient ring bearing seals S closing the annular space between the races 1 and 2.

Each seal S is annular, has one peripheral edge, shown as the outer edge, engaged in a radially-facing groove 5, 6 in the corresponding race and a second peripheral edge, shown as the inner edge, engaged in rubbing contact with the outer race. Clearly, however, the grooves could be in the inner race and the seals S could have rubbing contact with the outer race 1.

As will be seen from FIG. 2, each seal S consists of a unitary moulded resilient ring of rubber, or other suitable elastomeric material, with a flat rigid metal ring 8 embedded therein to extend radially through the full radial extent of the flat rubber web 7.

At its one periphery and extending radially away from the corresponding peripheral edge 8a of the metal ring 8, the rubber ring has a thin frusto-conical lip 9 which in use of the seal is flexibly deformed in making sealing contact against a concave surface 21 of the corresponding race of the bearing.

At its other periphery, which engages the groove 5 or 6, the ring has a peripheral bead 12 into which the corresponding edge 8b of the metal ring 8 extends.

The bead 12 has a plane surface 13 extending radially away from the adjacent edge 8b of the metal ring 8 and this plane surface 13 is located substantially in the medial plane of the metal ring 8. Extending from the inner limit of the surface 13 axially towards one end of the seal S, there is a frusto-conical surface 16 which together with the surface 13 forms a stepped rabbett 10 of slightly more than right-angle section. The bead also has a bevel formed by frusto-conical surface 11 which meets the plane surface 13 at its outer limit in a sharp edge 14 and which extends away from the edge 14 to a further plane surface 17 at the other end of the seal. The bead is axially thicker than the web 7 and metal ring 8 taken together and the surface 17 overlaps the adjacent edge 8b of the metal ring.

The bevel 11 which faces in one axial direction, and the abrupt step 13 which faces in the other direction facilitates assembly of the seal S to the bearing since the bevel provides a lead-in and the sharp edge portion of the bead 12 can be deflected over the surface 16 when the seal is pressed axially against the annular rib 22 which constitutes one boundary of the groove 5 or 6 in the race 1.

Once the edge 14 has snapped past the rib 22 into the groove 5, or 6, the surface 13 will, if the seal is urged in the sense to remove it from the race, butt against the rib 22 and will be buttressed against deflection by the material in the bevelled portion of the bead and by being supported radially by the metal ring 8. Thus removal of the seals S is strongly resisted.

The diameter of the feather edge 14 is such relatively to that of the groove 5 or 6 that when the seal S is fitted to the grooved race, the material of the bead 12 will spread slightly as is shown in FIGS. 3 and 4 so that the radial end surface 17 of the bead is pressed resiliently against the adjacent radial shoulder 15 of the race giving a good sealing effect.

The bead 12 does not completely fill the groove and is therefore suitable either for a rectangular section groove 5 as shown in FIG. 3 and to the left of FIG. 1, or for a circular section groove 6 as shown in FIG. 4 and at the right of FIG. 1.

We claim:

1. In a roller bearing of the class comprising an inner race, an outer race encircling the inner race in radially-spaced relation thereto, and a seal ring extending across the space between the races and having a peripheral lip in rubbing contact with one of the said races and a peripheral bead in an annular radially-facing groove in the other of the said races; a construction of said seal ring which consists of a substantially flat web of elastomeric material extending radially between and unitarily interconnecting the peripheral lip and the peripheral bead, and a flat rigid ring reinforcing the flat web of elastomeric material and extending radially therein from adjacent the said peripheral lip through the radial extent of the web and into the said peripheral bead, said lip being flexible and of less axial thickness than the said web as reinforced by said rigid ring, said bead having a first plane surface extending radially away from the reinforcing ring substantially in the medial plane of the reinforcing ring, a first frusto-conical surface meeting the said plane surface in a feather edge at that limit of said plane surface which is remote from the reinforcing ring, said frusto-conical surface providing a bevel on said bead facing in one axial direction, and an annular surface extending substantially axially from said plane surface at that limit thereof which is nearer the reinforcing ring, said plane surface and said annular surface together defining a rabbett facing in the opposite axial direction, and said edge being in elastically deformed contact with the wall of said groove, said bevel providing a lead-in facilitating entry of the bead into the groove and said plane surface providing a buttressed abutment opposing removal of the bead from the groove, the bead having a further surface which meets the frusto-conical surface remote from the feather edge and extends radially away from the frusto-conical surface and overlaps the adjacent edge of the flat reinforcing ring, said further surface engaging another wall of said groove.

2. A bearing as claimed in claim 1, the annular surface being frusto-conical and the rabbett being of slightly more than right-angle section.

References Cited

UNITED STATES PATENTS

| | | | |
|---|---|---|---|
| 2,467,049 | 4/1949 | Peterson | 308—187.2 |
| 2,755,113 | 7/1956 | Baumheckel | 308—187.2 |
| 2,757,052 | 7/1956 | Spurgeon | 308—187.1 |
| 2,834,616 | 5/1958 | Gebert | 308—187.1 X |
| 2,878,084 | 3/1959 | Bermingham | 308—187.1 |
| 2,917,328 | 12/1959 | Peterson | 308—187.1 X |
| 3,114,559 | 12/1963 | Miglietti | 308—187.2 X |
| 3,241,846 | 3/1966 | Peickii | 308—187.1 X |
| 3,276,826 | 10/1966 | Draudt | 308—187.2 |

FOREIGN PATENTS

| | | |
|---|---|---|
| 1,223,901 | 6/1960 | France. |

MARTIN P. SCHWADRON, *Primary Examiner.*

L. L. JOHNSON, *Assistant Examiner.*